US012686500B2

(12) United States Patent
Chatelois et al.

(10) Patent No.: US 12,686,500 B2
(45) Date of Patent: Jul. 21, 2026

(54) HYBRID AIRCRAFT PROPULSION SYSTEM WITH ELECTRIC MOTOR ALIGNMENT

(71) Applicant: Pratt & Whitney Canada Corp., Longueuil (CA)

(72) Inventors: Bruno Chatelois, Boucherville (CA); Paul Weaver, Chateauguay (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 352 days.

(21) Appl. No.: 18/440,677

(22) Filed: Feb. 13, 2024

(65) Prior Publication Data

US 2025/0256860 A1 Aug. 14, 2025

(51) Int. Cl.
*B64D 31/18* (2024.01)

(52) U.S. Cl.
CPC .......... *B64D 31/18* (2024.01); *F05D 2240/60* (2013.01)

(58) Field of Classification Search
CPC ............................ B64D 31/18; F05D 2230/64
See application file for complete search history.

(56) References Cited

U.S. PATENT DOCUMENTS

| | | | | |
|---|---|---|---|---|
| 4,187,940 A * | 2/1980 | Ratliff | ................... | F16D 25/044 |
| | | | | 464/158 |
| 10,119,465 B2 * | 11/2018 | Sheridan | ............... | F16H 1/2818 |

| | | | | |
|---|---|---|---|---|
| 10,392,119 B2 | 8/2019 | Niergarth et al. | | |
| 10,487,839 B2 | 11/2019 | Kupiszewski et al. | | |
| 11,371,379 B2 | 6/2022 | van der Merwe et al. | | |
| 11,519,289 B2 * | 12/2022 | Suciu | ........................ | F02C 3/10 |
| 11,685,537 B1 | 6/2023 | Spitzer | | |
| 2022/0251965 A1 | 8/2022 | Czarnik et al. | | |
| 2023/0124726 A1 * | 4/2023 | Pilgrim | .................. | B64D 27/10 |
| | | | | 475/5 |

FOREIGN PATENT DOCUMENTS

WO 2023/111433 A1 6/2023

OTHER PUBLICATIONS

European Search Report for EP Application No. 25157820.9 dated Jul. 11, 2025.

* cited by examiner

*Primary Examiner* — Justin D Seabe
(74) *Attorney, Agent, or Firm* — Carlson, Gaskey & Olds, P.C.

(57) ABSTRACT

A hybrid aircraft propulsion system includes a first motor operatively connected to a propulsor via a first motor driveshaft and is mounted to an engine static structure through engine mounts operable to adjust a position of the first motor and the first motor driveshaft. A second motor is an electric motor having a second motor driveshaft which is coaxial to the first motor driveshaft. The second motor is operatively connected to the propulsor via the second motor driveshaft to selectively drive the propulsor. A height compensation structure is operatively connected to the second motor and structured to adjust axial alignment of the second motor driveshaft relative to the first motor driveshaft to make the first motor driveshaft more coaxial to the second motor driveshaft.

20 Claims, 10 Drawing Sheets

HYBRID AIRCRAFT PROPULSION SYSTEM WITH ELECTRIC MOTOR ALIGNMENT

BACKGROUND

This applications relates to structure for maintaining aligned driveshafts between a first motor and an associated electric motor in a hybrid aircraft propulsion system.

Gas turbine engines are known, and typically include a propulsor delivering air as propulsion air. The propulsor also delivers air into a compressor where it is mixed with fuel and ignited.

Products of the combustion pass downstream across turbine rotors, driving them to rotate. A driveshaft is driven by the turbine rotors to in turn drive the propulsor and compressor rotors.

More recently, hybrid engine systems are being developed wherein an electric motor provides selective drive in addition to the drive provided by the gas turbine engine. This may allow the size of the gas turbine engine to be made smaller. As an example, at high power operation, such as takeoff of an associated aircraft, the electric motor may supplement the gas turbine engine power such that the high thrust required for takeoff can be achieved with a relatively smaller gas turbine engine.

In one type of hybrid engine system the electric motor drives a driveshaft which is coaxial with the driveshaft of the gas turbine engine.

Gas turbine engines are typically mounted to allow some adjustment in relative height and attitude such as through elastomeric engine mounts to static structure. As the height and attitude of the gas turbine engine adjusts, the height and attitude of its driveshaft may also change. When this occurs, it may raise challenges.

SUMMARY

A hybrid aircraft propulsion system includes a first motor operatively connected to a propulsor via a first motor driveshaft and is mounted to an engine static structure through engine mounts operable to adjust a position of the first motor and the first motor driveshaft. A second motor is an electric motor having a second motor driveshaft which is coaxial to the first motor driveshaft. The second motor is operatively connected to the propulsor via the second motor driveshaft to selectively drive the propulsor. A height compensation structure is operatively connected to the second motor and structured to adjust axial alignment of the second motor driveshaft relative to the first motor driveshaft to make the first motor driveshaft more coaxial to the second motor driveshaft.

These and other features will be best understood from the following drawings and specification, the following is a brief description.

DETAILED DESCRIPTION

Figure 1:
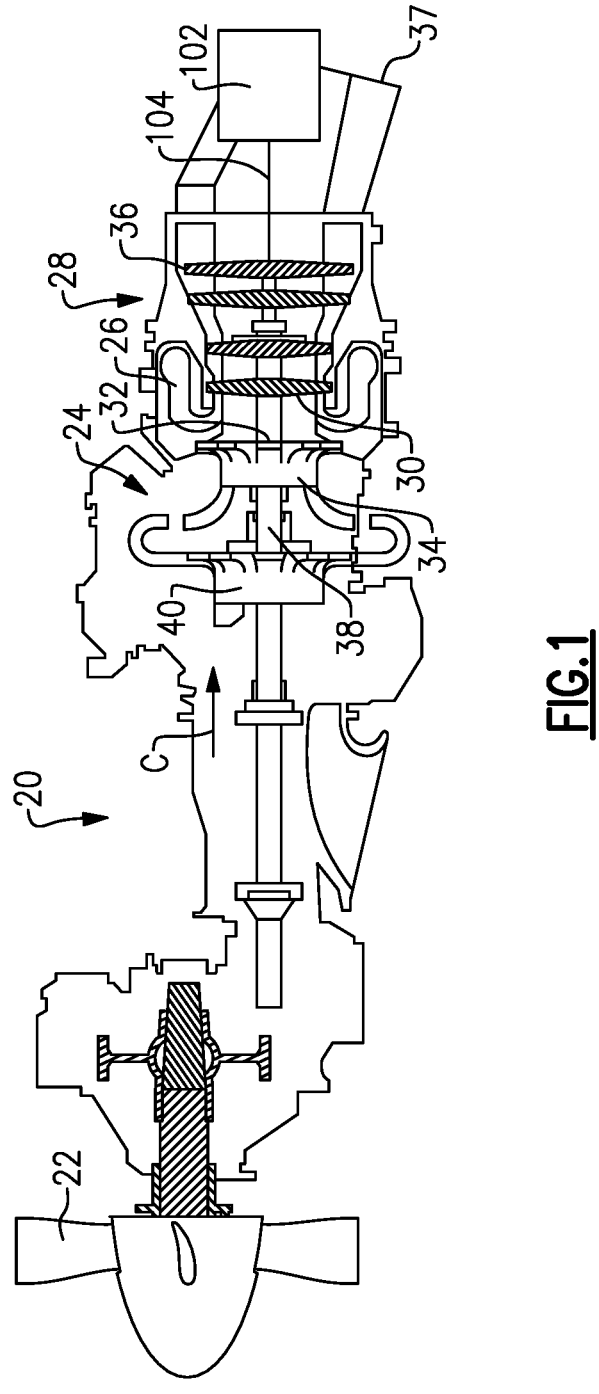
FIG. 1 schematically shows a gas turbine engine and associate electric motor.

FIG. 1 schematically illustrates a hybrid aircraft propulsion system including gas turbine engine 20. The example gas turbine engine 20 is a turboprop that generally incorporates a propulsor 22, a compressor section 24, a combustor section 26 and a turbine section 28. The propulsor 22 drives air for propulsion. The turbine engine 20 intakes air along a core flow path C into the compressor section 24 for compression and communication into the combustor section 26. In the combustor section 26, the compressed air is mixed with fuel and ignited to generate an exhaust gas flow that expands through the turbine section 28 and is exhausted through exhaust nozzle 37. The turbine section has a high pressure turbine 30 that drives shaft 32 to drive the high pressure compressor 34. The turbine section 28 also has a low pressure turbine 36 driving a shaft 38 to drive a low pressure compressor 40, and the propulsor 22. An exhaust nozzle 37 bends for packaging reasons. A bore allows shaft 104 to extend through it and be protected. Although not shown, there would be a gear connection between the shaft 38 and the propulsor 22.

A driveshaft 104 is shown being driven by electric motor 102 to drive the shaft 38. The electric motor 102 is controlled as described below along with the gas turbine engine 20. The gas turbine engine 20 of FIG. 1 is shown as part of a hybrid aircraft propulsion system 100 in FIG. 2, with the inclusion of an electric motor 102 driving a shaft 104. Shaft 104 is connected directly to the propulsor low pressure turbine 36 of the gas turbine engine 20.

As shown, there are elastomeric mounts 105 and 106 on the gas turbine engine 20. Mounts 105/106 connect gas turbine engine 20 to static structure S, shown schematically. In practice there may be many more mounts.

As known, the elastomeric engine mounts 105 and 106 allow the height and attitude of the gas turbine engine 20 to change.

Figure 2:
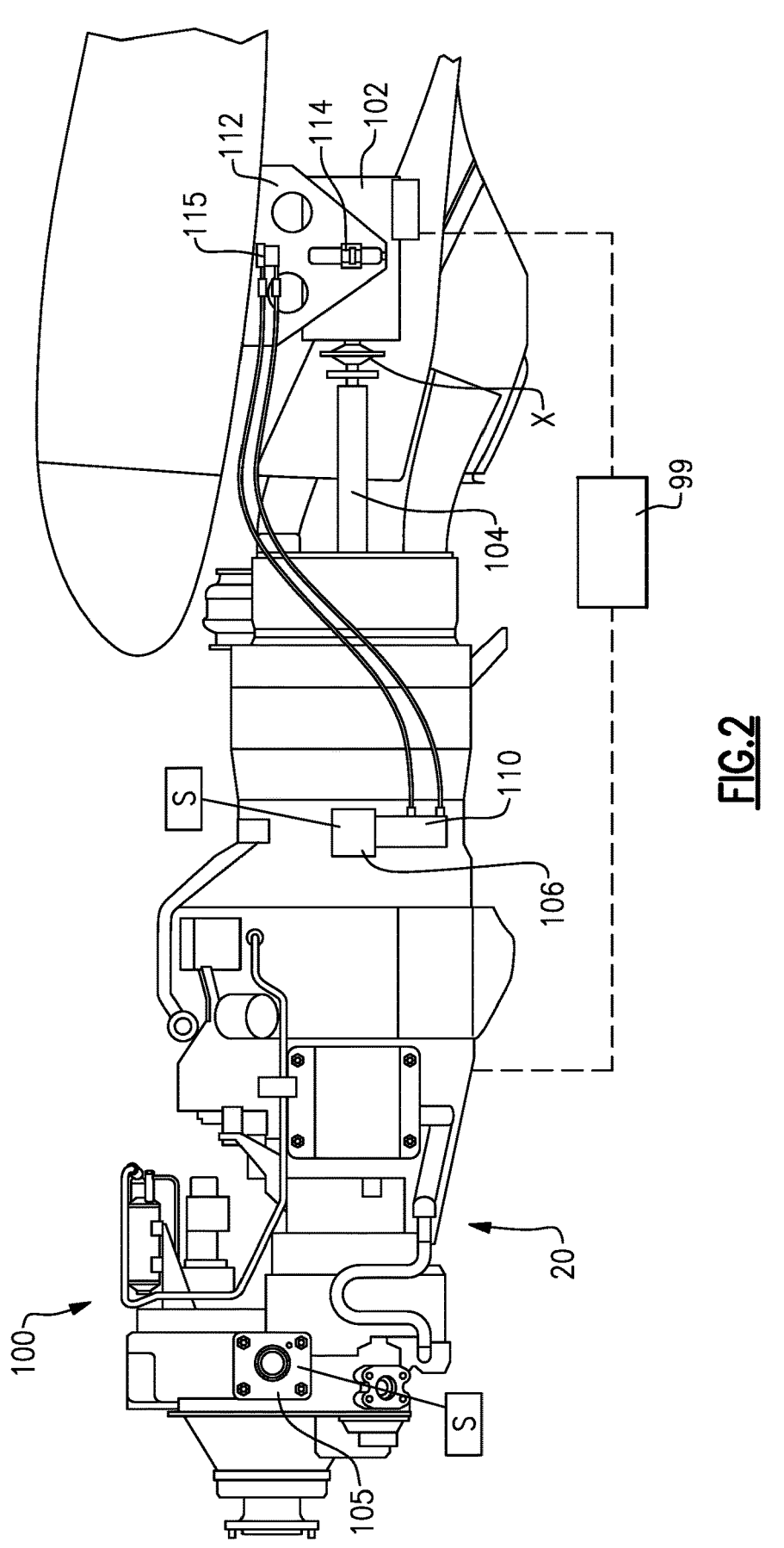
FIG. 2 shows a height compensation system for an electric motor and gas turbine engine.

FIG. 2 shows a hydraulic actuator 110 communicates hydraulic fluid to an electric motor actuator, or height compensation structure 115 include a mount plate 112 for the electric motor 102. Embodiments of height compensation structure 115 include hydraulic structure described in more detail with regard to FIGS. 4A and 8A. Also electric motor mount embodiments as shown in FIG. 3 or 5-7 are also part of height compensation structure 115. A spring mechanism and sliding joint 114 is illustrated as one example electric motor mount.

A control 99 is shown schematically, and selectively controls gas turbine engine 20, and electric motor 102. The electric motor 102 is selectively driven to provide drive through driveshaft 104 to supplement rotation of the driveshaft 29 in gas turbine engine 20 under certain conditions. As one example, at high power conditions, such as takeoff, control 99 will provide supplemental electric motor power.

As another example, under certain conditions the electric motor 102 may provide sole power in place of the gas turbine engine 20.

The control could be incorporated into a full authority digital electronic controller ("FADEC") such as are known for current hybrid engine systems.

While a gas turbine engine 20 is disclosed, broadly speaking, this application discloses a hybrid aircraft propulsion system. The gas turbine engine could be replaced by a rotary engine, a piston engine, an electric motor, or other sources of drive. Thus, for purposes of the scope of this application these could be thought of collectively as a first motor, with the electric motor being thought of as a second motor.

Figure 3:
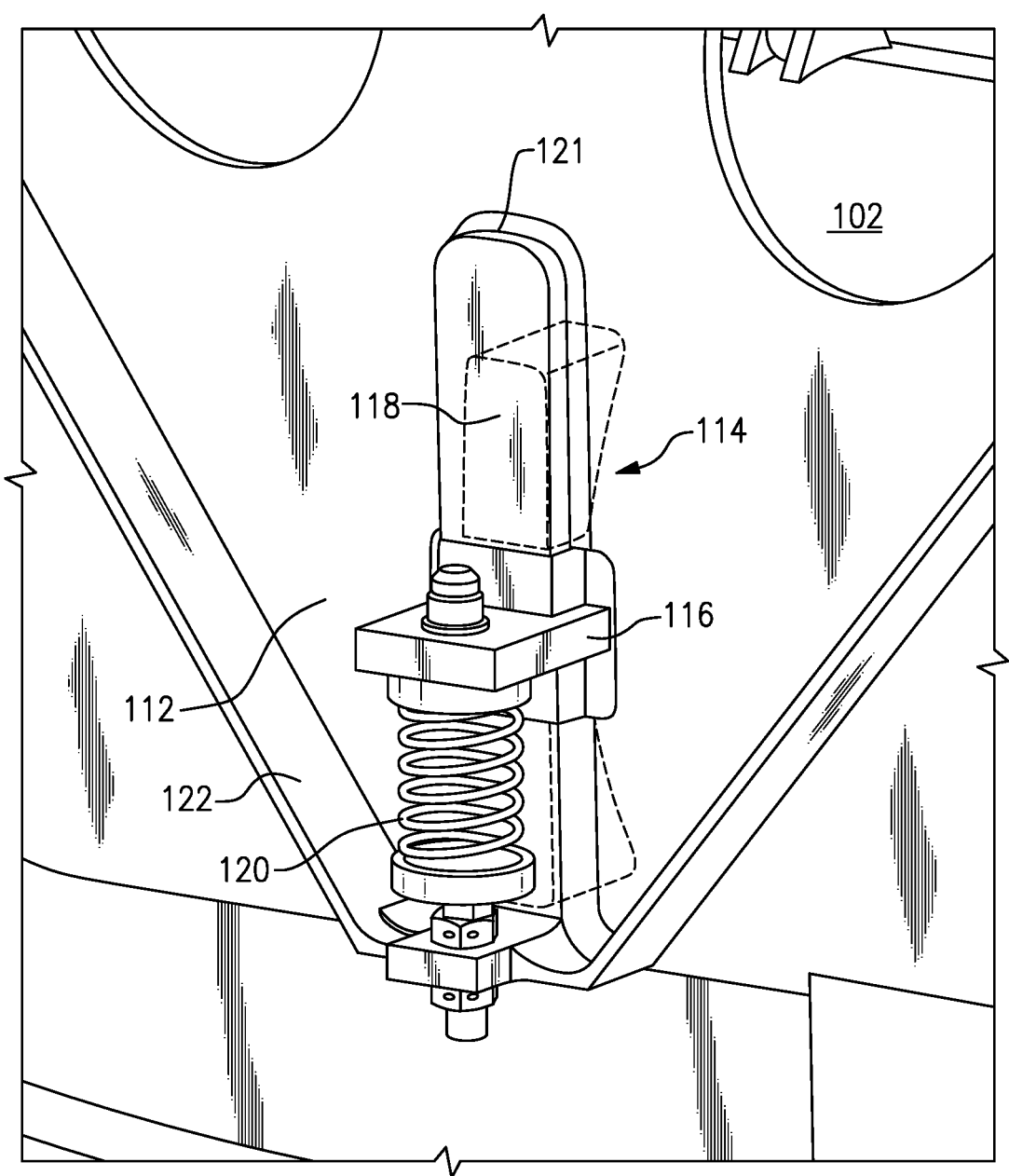
FIG. 3 shows a detail of the FIG. 2 system.

As shown in FIG. 3, an electric motor mount includes spring mechanism and sliding joint 114 that includes a spring 120 biasing a plate 116 away from a static mount 122 for the electric motor 102. A guide 121 receives a tongue 118 from the electric motor 102 such that the electric motor can adjust vertically.

Figure 4A:
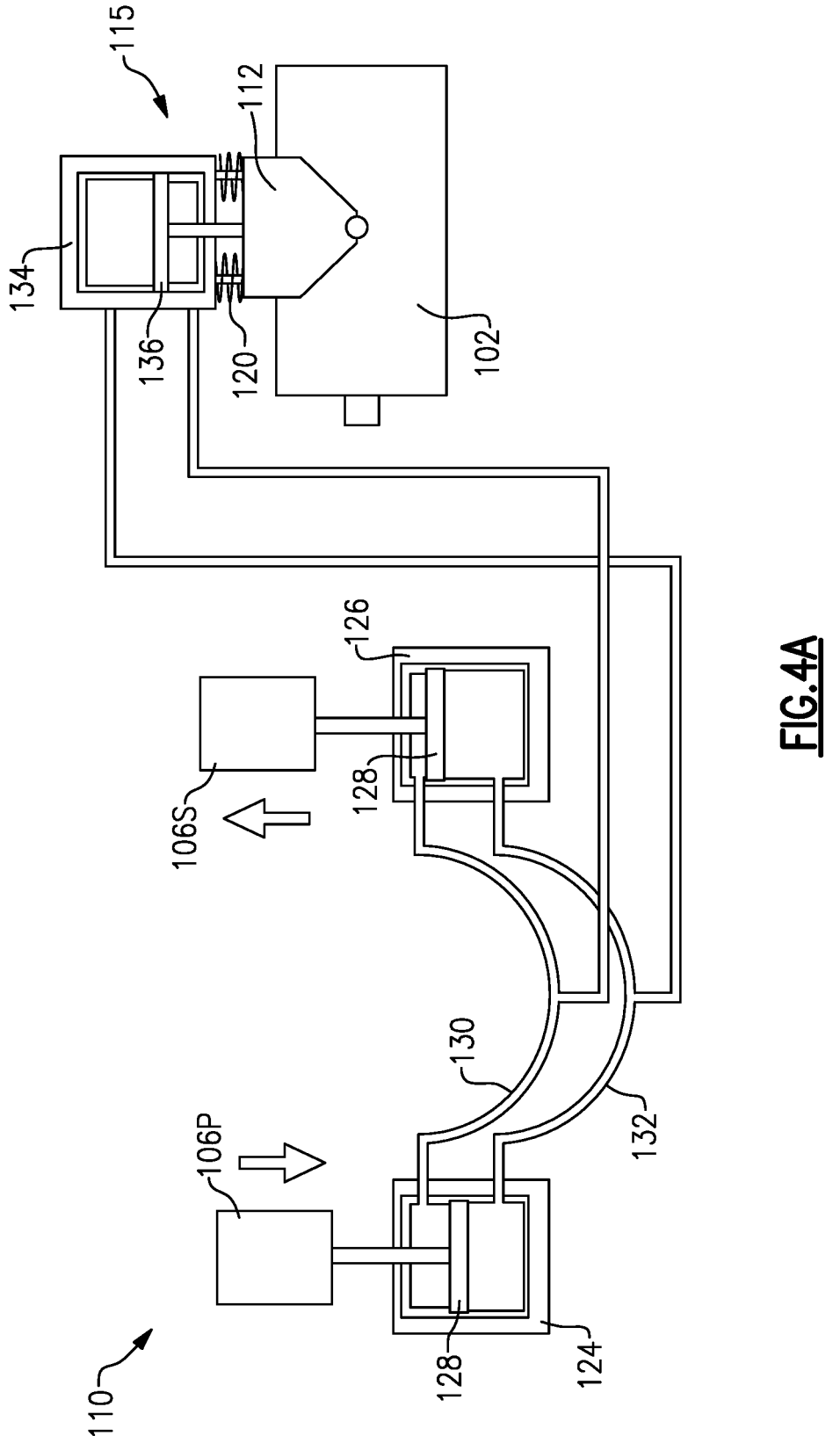
FIG. 4A shows hydraulic connections within the FIG. 2 engine.

FIG. 4A shows a hydraulic system 110 associated with the gas turbine engine 20 and for providing feedback to the height compensation structure 115 as the engine 20 has its height changed.

A rear port mount 106P and a rear starboard mount 106S on the gas turbine engine move as the engine moves and adjusts the position of a piston 128 in hydraulic cylinders 124 and 126. As shown, the port and starboard hydraulic cylinders are combined together with lines 130 and 132, to average the hydraulic pressure and volume and minimize the effect of the engine rotation on the height compensation. For example, when the engine rotates due to torque, the port mount moves downward and the starboard mounts moves upward, the net hydraulic fluid to the electric actuator will be zero. However if both port and starboard mounts move in the same direction, the net hydraulic fluid will cause a piston 136 in cylinder 134 of an electric motor actuator to move, compensating for the height change. This system is utilized with system 114 of FIG. 3.

Thus, as the gas turbine engine 20 changes its height, or adjusts its orientation between port and starboard, hydraulic fluid moves between the two cylinders 124 and 126. However, the fluid is also delivered into opposed chambers within cylinder 134 driving a piston 136 for the height compensation system 115. As can be appreciated, as the piston 136 moves it moves the mount plate 112 such that the location of the electric motor 102 also adjusts and responds to adjustment of the engine 20. In this manner, the orientation of the driveshafts 104 and 27 on the electric motor 102 and the gas turbine engine 20 are brought closer to being coaxial. Again, the height compensation system 115 includes chamber 134, piston 136, spring 120, plate 112 and the mount of FIG. 3.

Figure 4B:
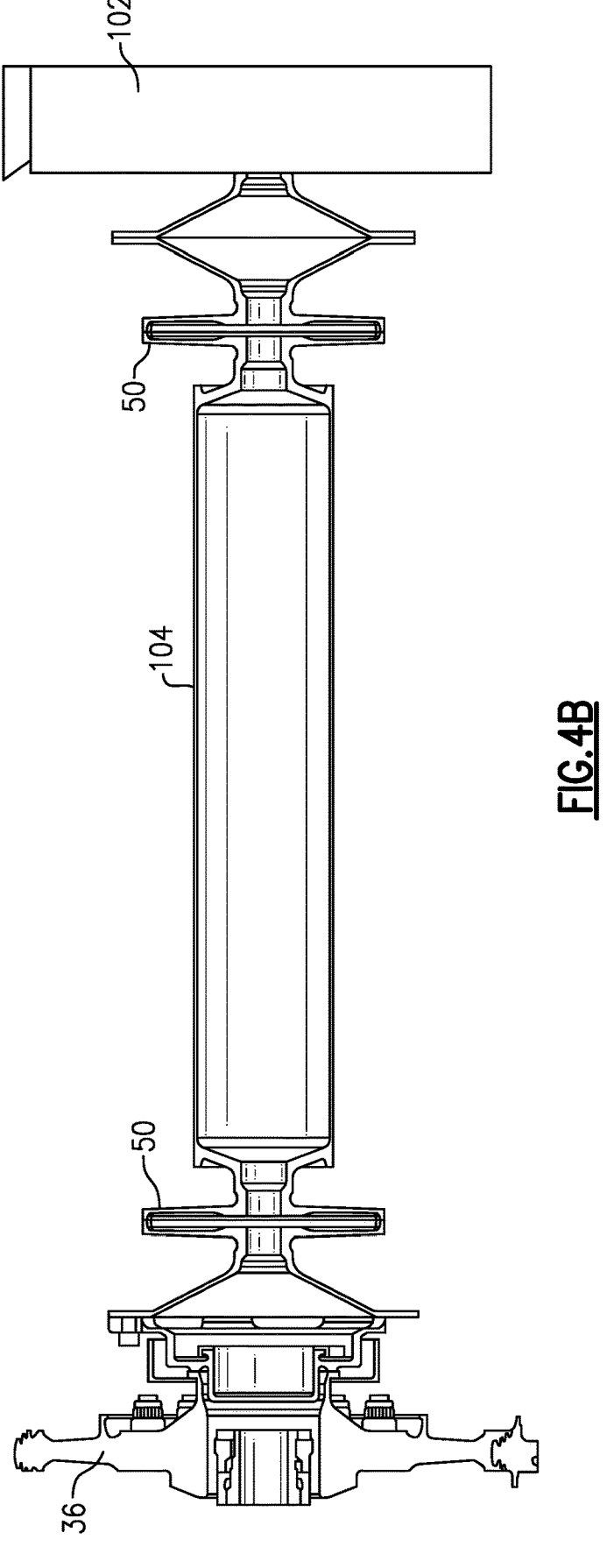
FIG. 4B shows a drive connection for the FIG. 3 embodiment.

Since the FIG. 3 embodiment will provide height adjustment, but will not provide any ability to pivot, the FIG. 3 system is preferably used with a drive connection for shaft 104 as shown in FIG. 4B. Flexible diaphragms 50 connect the shaft 104 to both the electric motor 102 and the low pressure turbine 36, allowing for pivoting compensation between the engine 20 and the electric motor 102.

Figure 5:
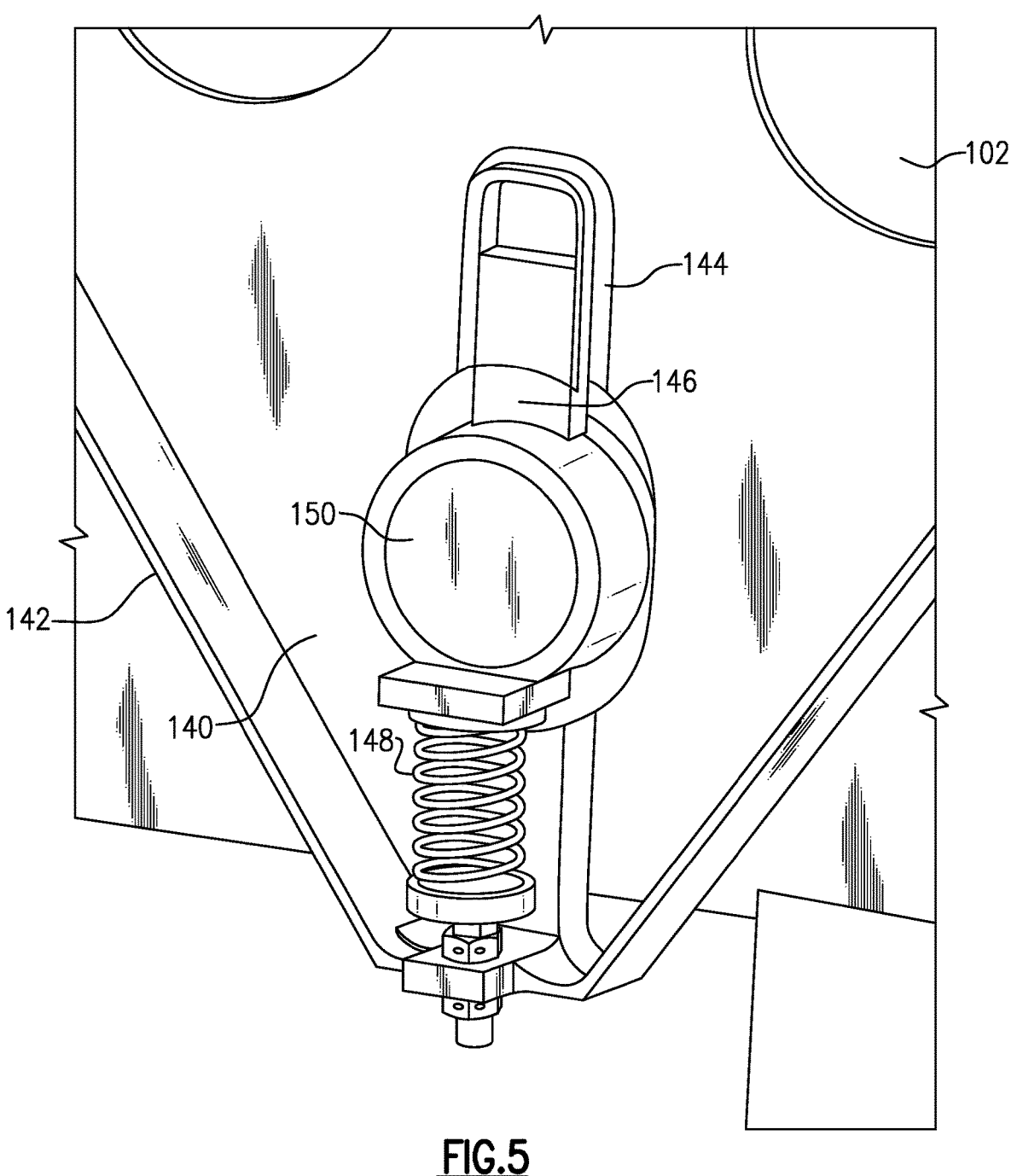
FIG. 5 shows an alternative electric motor mount.

FIG. 5 shows an alternative electric motor mount embodiment 139 still having the guide 144 and tongue 146 which is movable within the guide. A spring 148 biases the tongue 146 relative to a static mount 142. The mount plate 140 is moving with the electric motor 102. However, there is also a pivot connection 150 allowing the electric motor 102 to pivot relative to the static mount 142 as the engine adjusts its position.

Figure 6:
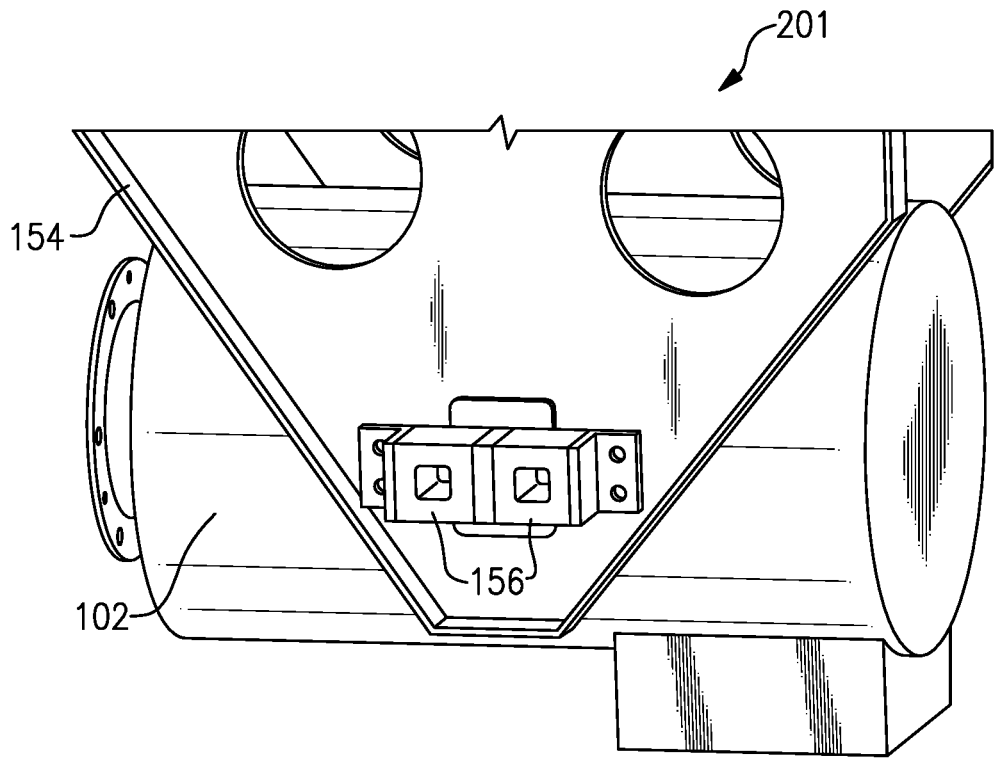
FIG. 6 shows yet another alternative electric motor mount.

FIG. 6 shows yet another electric motor mount embodiment 201 wherein the motor 102 is connected to the static structure by mount plate 154, and through elastomeric mounting blocks 156. This embodiment allows vertical and rotation movement.

Figure 7:
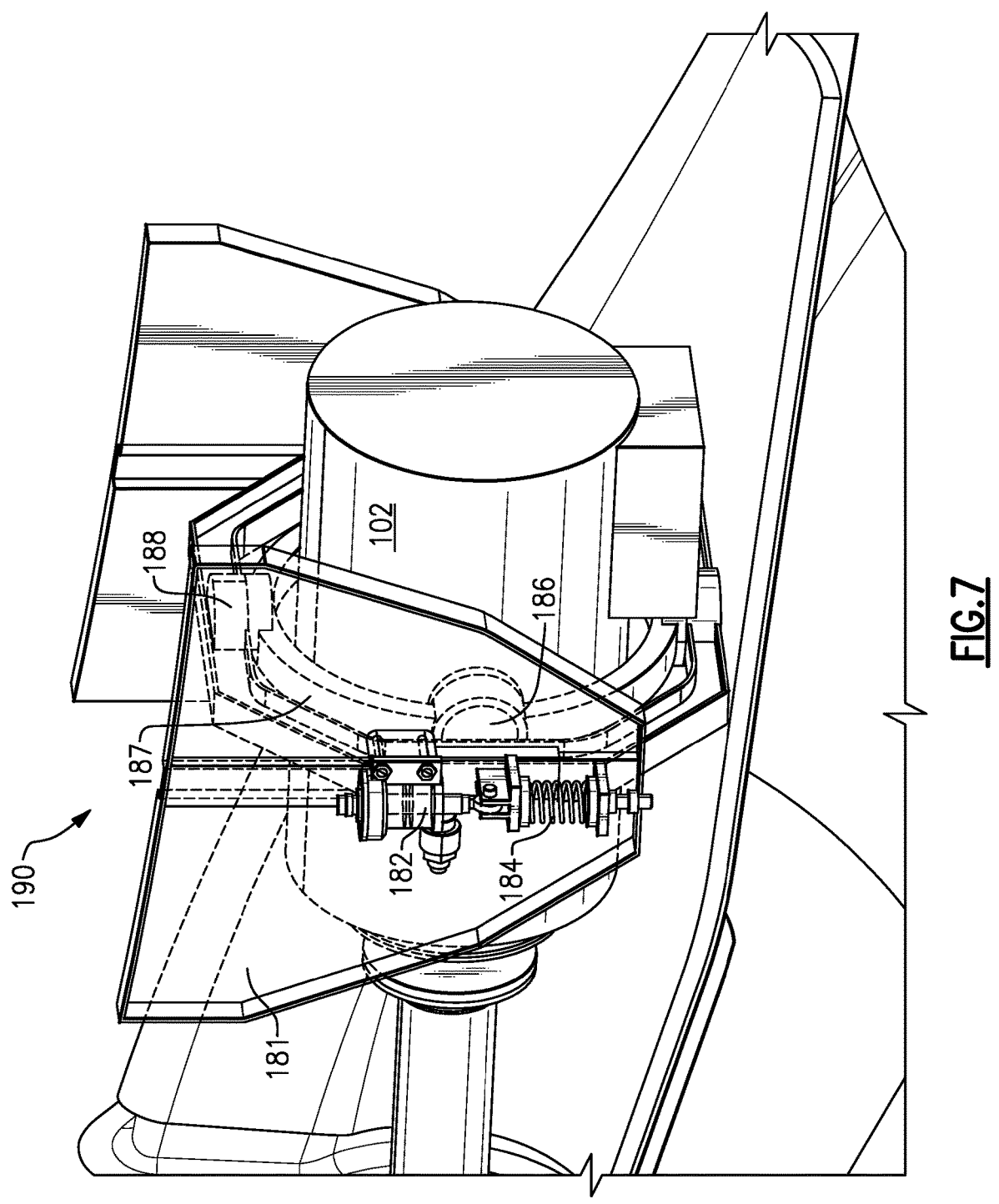
FIG. 7 shows yet another alternative electric motor mount.

FIG. 7 shows yet another electric motor mount embodiment 190 wherein the electric motor 102 is connected to a gimbal frame. Here a static mount plate 181 mounts the hydraulic piston 182, and with a spring bias 184. A first gimbal 187 is pivotally connected at 186 to the electric motor. This allows pivoting perpendicular to the rotational axis of the electric motor 102. However, the first gimbal mount 187 is received in a second gimbal connection 188 to the static structure 181. This allows pivoting essentially in a vertical direction as shown in FIG. 7, that is, top to bottom of the Figure.

Figure 8A:
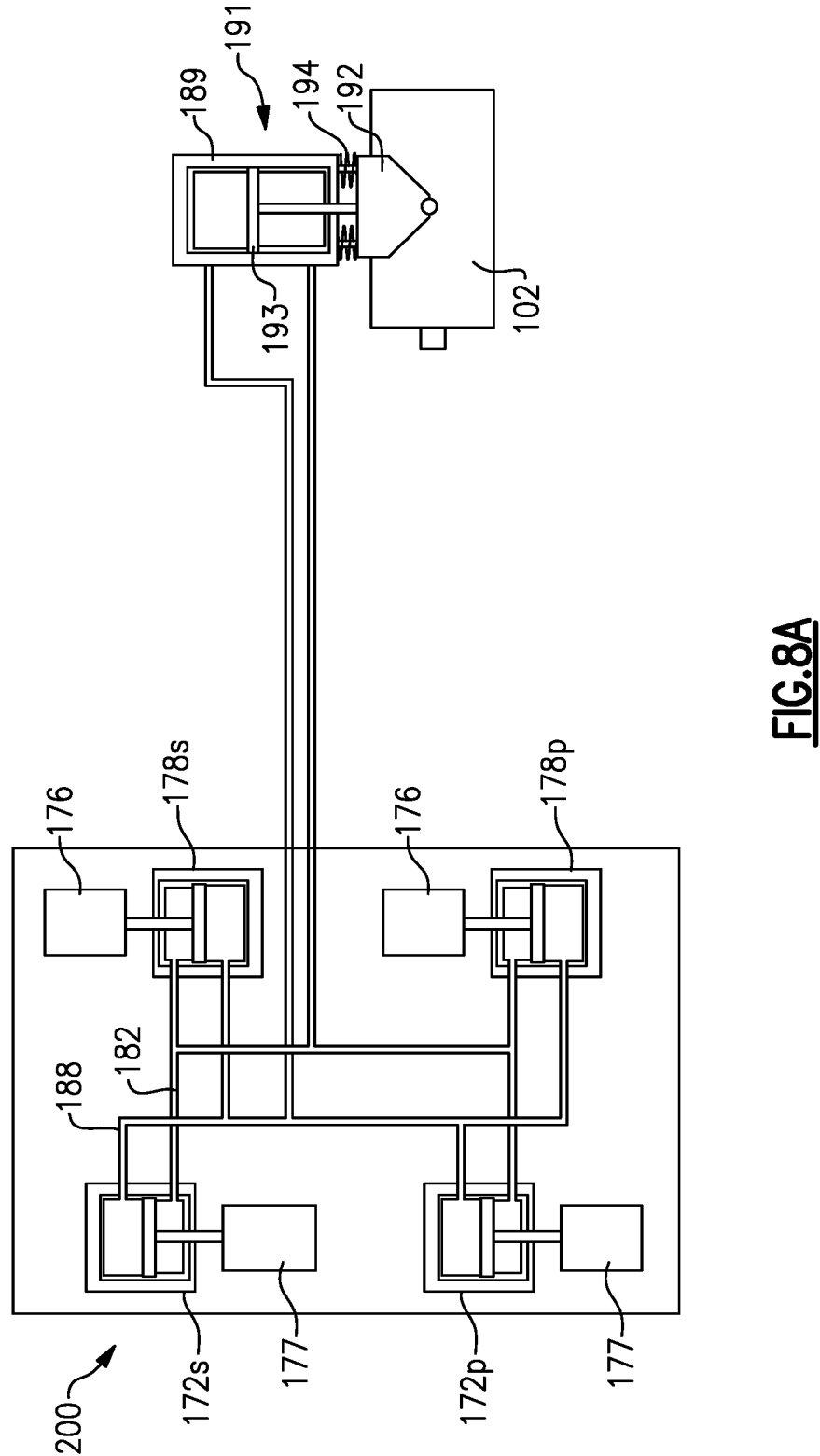
FIG. 8A shows an alternative hydraulic system.

FIG. 8A shows an alternative hydraulic system 200 wherein front starboard and port mounts 177 are shown with cylinders 172S and 172P communicating through lines 188 and 182 to a set of rear starboard and port cylinders 178S and 178P, and mounts 176 that are fixed to the gas turbine engine and move with a piston. The lines 188 and 182 further communicate with a single cylinder 189 having a piston 193 as part of height compensation system 191. The front cylinders 172S/172P compensate for the engine attitude and the rear cylinders 178s/178P compensate for the height of the engine. A mount plate 192 moves with piston 193 to adjust the position of the electric motor 102. Springs 194 assist in positioning the electric motor 102.

FIG. 8A may be utilized with the FIGS. 5-7 embodiments to allow height adjustment and pivoting.

Figure 8B:
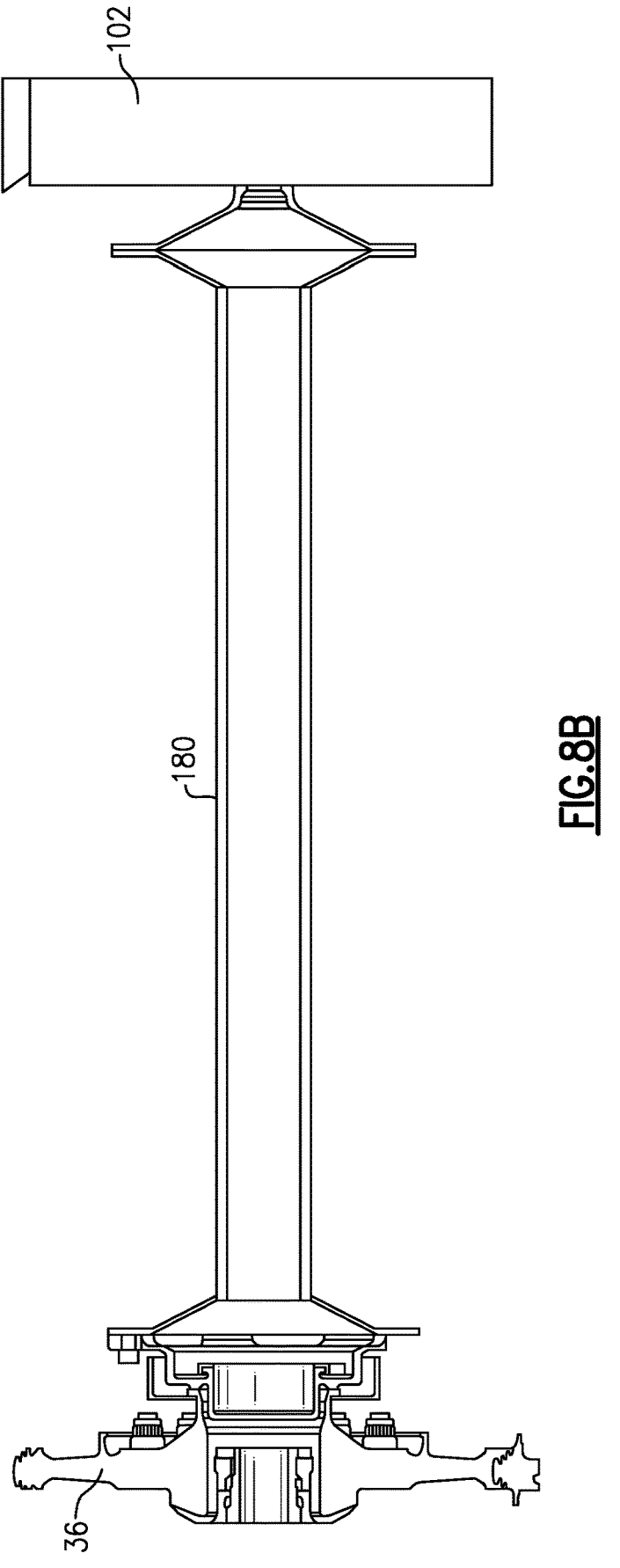
FIG. 8B shows a drive connection for the FIGS. 5-7 embodiments.

A driveshaft is shown in FIG. 8B connecting the electric motor 102 to the low pressure turbine 36. This embodiment would be utilized with the adjustment systems of FIGS. 5-7. Since the FIGS. 5-7 systems allow pivoting movement, two diaphragms of the FIG. 4B embodiment are not required.

A hybrid aircraft propulsion system under this disclosure could be said to include a first motor operatively connected to a propulsor via a first motor driveshaft and is mounted to an engine static structure through mounts operable to adjust a position of the first motor and the first motor driveshaft. A second motor is an electric motor having a second motor driveshaft which is coaxial to the first motor driveshaft. The second motor is operatively connected to the propulsor via a second motor driveshaft to selectively drive the propulsor. A height compensation structure is operatively connected to the first motor driveshaft and the second motor driveshaft and structured to adjust axial alignment of the first motor driveshaft relative to the second motor driveshaft to make the first motor driveshaft more coaxial to the second motor driveshaft.

In another embodiment according to the previous embodiment, the first motor is one or more of a gas turbine engine, a rotary engine, a reciprocating engine, and an electric motor.

In another embodiment according to any of the previous embodiments, the second motor is mounted through a second motor mount such that it can slide within a guide, and is provided with a spring bias to control the amount of movement of the second motor. The second motor mount is part of the height compensation system.

In another embodiment according to any of the previous embodiments, a hydraulic connection between the first motor and the height compensation structure communicates movement of the first motor to the height compensation to provide adjustment of the height of the second motor in response to adjustment of the height of the first motor.

In another embodiment according to any of the previous embodiments, the hydraulic connection provides feedback of both an attitude change and a height change of the first motor to the height compensation structure.

In another embodiment according to any of the previous embodiments, there is the second motor mount having a pivot connection between the second motor and second motor static structure such that the second motor can pivot and move vertically with the first motor.

In another embodiment according to any of the previous embodiments, the second motor mount includes a gimbal member which is pivotally mounted to the second motor to allow pivoting movement about a first axis, and the gimbal structure is pivotally mounted to the second motor static structure such that second motor may also pivot about a second axis.

In another embodiment according to any of the previous embodiments, there are elastomeric mounting blocks as part of the second motor mount and the second motor static structure that allow the adjustment of the second motor in response to movement of the first motor.

In another embodiment according to any of the previous embodiments, there are a pair of front mount hydraulic cylinders associated with port and starboard sides of the first motor, and a pair of rear port and starboard mounts associated with the first motor, each having fluid cylinders and fluid pistons, and communicating hydraulic fluid between opposed chambers on each side of the respective fluid pistons to each of the front starboard and port mounts and rear starboard and port mounts, and to a second motor adjustment cylinder having a second motor piston that is part of the height compensation structure.

In another embodiment according to any of the previous embodiments, the second motor driveshaft is connected to the first motor driveshaft and to the second motor through flexible diaphragms.

In another embodiment according to any of the previous embodiments, a hydraulic connection between the first motor and the height compensation structure communicates movement of the first motor to the height compensation structure to provide adjustment of the height of the second motor in response to adjustment of the height of the first motor.

In another embodiment according to any of the previous embodiments, there is a second motor mount as part of the height compensation system, with an element on the second motor is guided within a guide on the second motor mount to allow height adjustment.

In another embodiment according to any of the previous embodiments, the hydraulic connection provides feedback of both an attitude change and a height change of the first motor to the height compensation structure.

In another embodiment according to any of the previous embodiments, the second motor mount also includes a pivot connection between the second motor and second motor static structure such that the second motor can pivot and move vertically with the first motor.

In another embodiment according to any of the previous embodiments, a control for the first motor and the second motor operates the second motor selectively under high power conditions to supplement the drive from the first motor.

In another embodiment according to any of the previous embodiments, there are a pair of front mount hydraulic cylinders associated with port and starboard sides of the first motor, and a pair of rear port and starboard mounts associated with the first motor, each having fluid cylinders and fluid pistons, and communicating hydraulic fluid between opposed chambers on each side of the respective fluid pistons to each of the front starboard and port mounts and rear starboard and port mounts, and to a first second motor adjustment cylinder having a second motor piston that is part of the height compensation structure.

In another embodiment according to any of the previous embodiments, the second motor mount includes a gimbal member which is pivotally mounted to the second motor to allow pivoting movement about a first axis, and the gimbal structure is pivotally mounted to the second motor static structure such that second motor may also pivot about a second axis.

In another embodiment according to any of the previous embodiments, there are elastomeric mounting blocks as part of a second motor mount that is part of the height compensation structure and second motor static structure that allow adjustment of the second motor in response to movement of the first motor.

In another embodiment according to any of the previous embodiments, the second motor driveshaft is connected to the first motor driveshaft and to the second motor through flexible diaphragms.

In another embodiment according to any of the previous embodiments, a control for the second motor and the first motor operates the second motor selectively under high power conditions to supplement the drive from the first motor.

Although embodiments have been disclosed, a worker of skill in this art would recognize that modifications would come within the scope of this disclosure. For that reason, the following claims should be studied to determine the true scope and content.

What is claimed is:

1. A hybrid aircraft propulsion system, comprising:
a first motor operatively connected to a propulsor via a first motor driveshaft and being mounted to an engine static structure through engine mounts operable to adjust a position of the first motor and the first motor driveshaft;
a second motor, being an electric motor having a second motor driveshaft which is coaxial to the first motor driveshaft, the second motor being operatively connected to the propulsor via the second motor driveshaft to selectively drive the propulsor; and
a height compensation structure operatively connected to the second motor and structured to adjust axial alignment of the second motor driveshaft relative to the first motor driveshaft to make the first motor driveshaft more coaxial to the second motor driveshaft.

2. The hybrid system as set forth in claim 1, wherein the first motor is one or more of a gas turbine engine, a rotary engine, a reciprocating engine, and an electric motor.

3. The hybrid system as set forth in claim 2, wherein the second motor is mounted through a second motor mount such that it can slide within a guide, and is provided with a spring bias to control the amount of movement of the second motor, the second motor mount being part of the height compensation system.

4. The hybrid system as set forth in claim 3, wherein a hydraulic connection between the first motor and the height compensation structure communicates movement of the first motor to the height compensation to provide adjustment of the height of the second motor in response to adjustment of the height of the first motor.

5. The hybrid system as set forth in claim 4, wherein the hydraulic connection provides feedback of both an attitude change and a height change of the first motor to the height compensation structure.

6. The hybrid system as set forth in claim 5, wherein there is the second motor mount has a pivot connection between the second motor and second motor static structure such that the second motor can pivot and move vertically with the first motor.

7. The hybrid system as set forth in claim 6, wherein the second motor mount includes a gimbal member which is pivotally mounted to the second motor to allow pivoting movement about a first axis, and the gimbal structure is pivotally mounted to the second motor static structure such that second motor may also pivot about a second axis.

8. The hybrid system as set forth in claim 5, wherein there are elastomeric mounting blocks as part of the second motor mount and the second motor static structure that allow the adjustment of the second motor in response to movement of the first motor.

9. The hybrid system as set forth in claim 5, wherein there are a pair of front mount hydraulic cylinders associated with port and starboard sides of the first motor, and a pair of rear port and starboard mounts associated with the first motor, each having fluid cylinders and fluid pistons, and communicating hydraulic fluid between opposed chambers on each side of the respective fluid pistons to each of the front starboard and port mounts and rear starboard and port mounts, and to a second motor adjustment cylinder having a second motor piston that is part of the height compensation structure.

10. The hybrid system as set forth in claim 2, wherein the second motor driveshaft is connected to the first motor driveshaft and to the second motor through flexible diaphragms.

11. The hybrid system as set forth in claim 1, wherein a hydraulic connection between the first motor and the height compensation structure communicates movement of the first motor to the height compensation structure to provide adjustment of the height of the second motor in response to adjustment of the height of the first motor.

12. The hybrid system as set forth in claim 11, wherein there is a second motor mount as part of the height compensation system, with an element on the second motor is guided within a guide on the second motor mount to allow height adjustment.

13. The hybrid system as set forth in claim 12, wherein the hydraulic connection provides feedback of both an attitude change and a height change of the first motor to the height compensation structure.

14. The hybrid system as set forth in claim 3, wherein the second motor mount also includes a pivot connection between the second motor and second motor static structure such that the second motor can pivot and move vertically with the first motor.

15. The hybrid system as set forth in claim 14, wherein a control for the first motor and the second motor operates the second motor selectively under high power conditions to supplement the drive from the first motor.

16. The hybrid system as set forth in claim 14, wherein there are a pair of front mount hydraulic cylinders associated with port and starboard sides of the first motor, and a pair of rear port and starboard mounts associated with the first motor, each having fluid cylinders and fluid pistons, and communicating hydraulic fluid between opposed chambers on each side of the respective fluid pistons to each of the front starboard and port mounts and rear starboard and port mounts, and to a first second motor adjustment cylinder having a second motor piston that is part of the height compensation structure.

17. The hybrid system as set forth in claim 14, wherein the second motor mount includes a gimbal member which is pivotally mounted to the second motor to allow pivoting movement about a first axis, and the gimbal structure is pivotally mounted to the second motor static structure such that second motor may also pivot about a second axis.

18. The hybrid system as set forth in claim 1, wherein there are elastomeric mounting blocks as part of a second motor mount that is part of the height compensation structure and second motor static structure that allow adjustment of the second motor in response to movement of the first motor.

19. The hybrid system as set forth in claim 1, wherein the second motor driveshaft is connected to the first motor driveshaft and to the second motor through flexible diaphragms.

20. The hybrid system as set forth in claim 1, wherein a control for the second motor and the first motor operates the second motor selectively under high power conditions to supplement the drive from the first motor.

* * * * *